Dec. 13, 1938.  S. V. McCONNELL ET AL  2,139,690
WIENER VENDING MACHINE
Original Filed March 20, 1935  4 Sheets-Sheet 1

INVENTORS:
S. V. McConnell
R. P. Olsson
BY
ATTORNEY

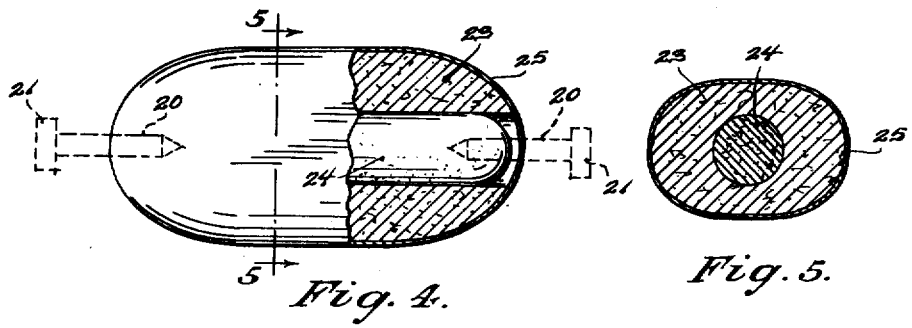
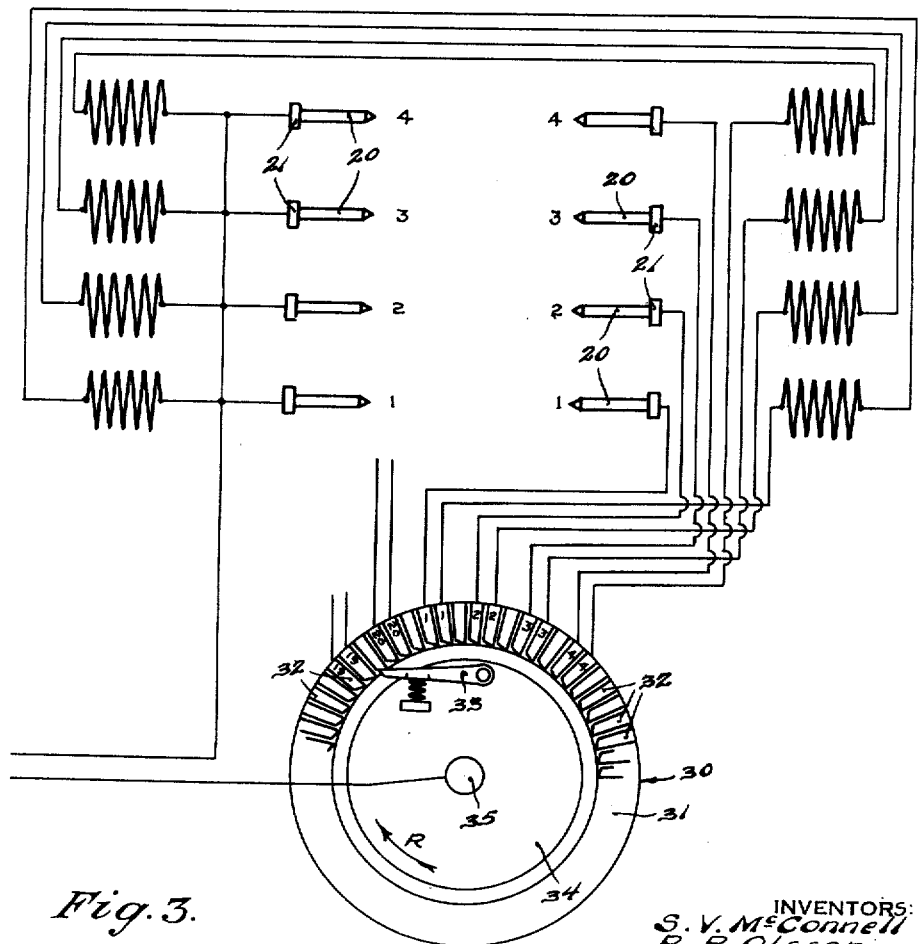

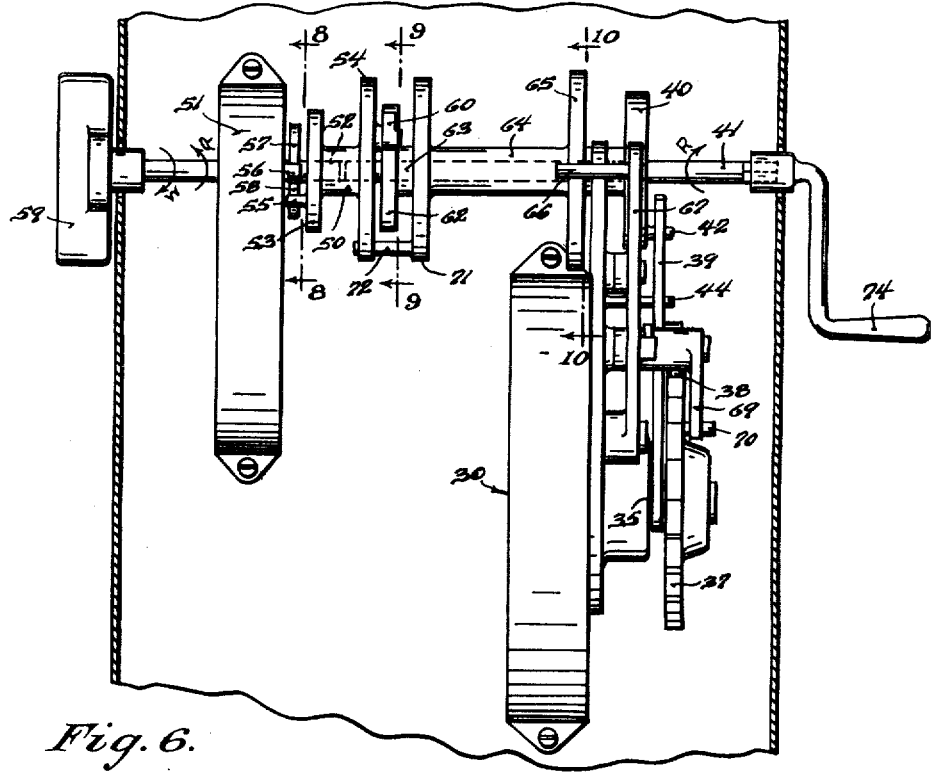

Dec. 13, 1938.　　　S. V. McCONNELL ET AL　　　2,139,690
WIENER VENDING MACHINE
Original Filed March 20, 1935　　4 Sheets-Sheet 4

INVENTORS:
S. V. McConnell
R. P. Olsson
BY
Edward E. Varno
ATTORNEY

Patented Dec. 13, 1938

2,139,690

UNITED STATES PATENT OFFICE 2,139,690

WIENER VENDING MACHINE

Samuel Verner McConnell and Robert P. Olsson, Seattle, Wash.

Application March 20, 1935, Serial No. 12,010
Renewed May 11, 1938

21 Claims. (Cl. 219—19)

This invention relates to a vending machine for wiener sandwiches, the object, stated generally, being to perfect a machine which will operate in an especially simple manner to broil and vend, under conditions of utmost sanitation, what is commonly referred to as "hot dogs", such product consisting in a wiener enclosed in a bun.

The particular objects of the invention will become apparent in the course of the following detailed description and claims, the invention consisting in the peculiar construction, adaptation, and combination of parts constituting the machine, as well as in the novel method by which the vending of the wiener sandwiches is accomplished.

In the drawings:—

Fig. 1 is a front elevation indicating the now preferred embodiment of the machine, parts being broken away and shown in transverse vertical section, and Fig. 2 is a side elevation thereof, parts being similarly broken away to show the machine in longitudinal vertical section. Both views represent a plurality of the wiener sandwiches in position preparatory to broiling and dispensing the same to successive customers.

Fig. 3 is an enlarged diagrammatic view indicating, in conjunction with the control switch, the electrical circuits employed in the machine.

Figs. 4 and 5 represent a wiener sandwich as employed in the machine, the former being a side elevation with parts broken away and shown in section and the pins by means of which a current is passed through the wiener being dotted, the latter view being taken in transverse section on the line 5—5 of Fig. 4.

Fig. 6 is a top plan view of the control mechanism used in the machine.

Fig. 7 is a detail rear elevation thereof with the parts indicated in neutral position, the driving shaft extension by means of which the switch mechanism is set for the initial vending of a sandwich, following a filling operation, being shown in section.

Figure 1:
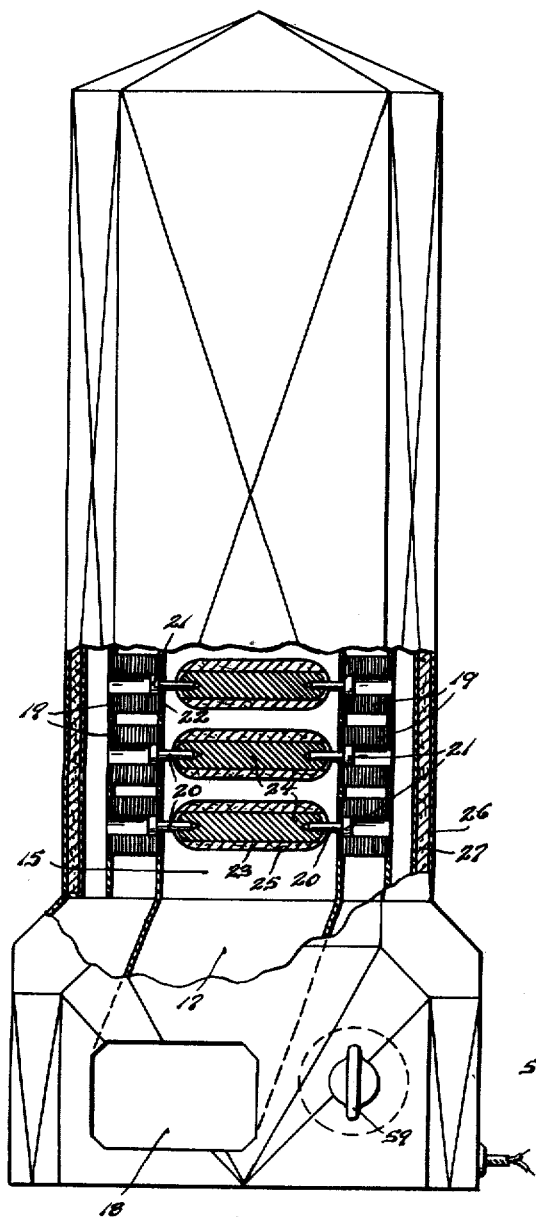
Figure 2:
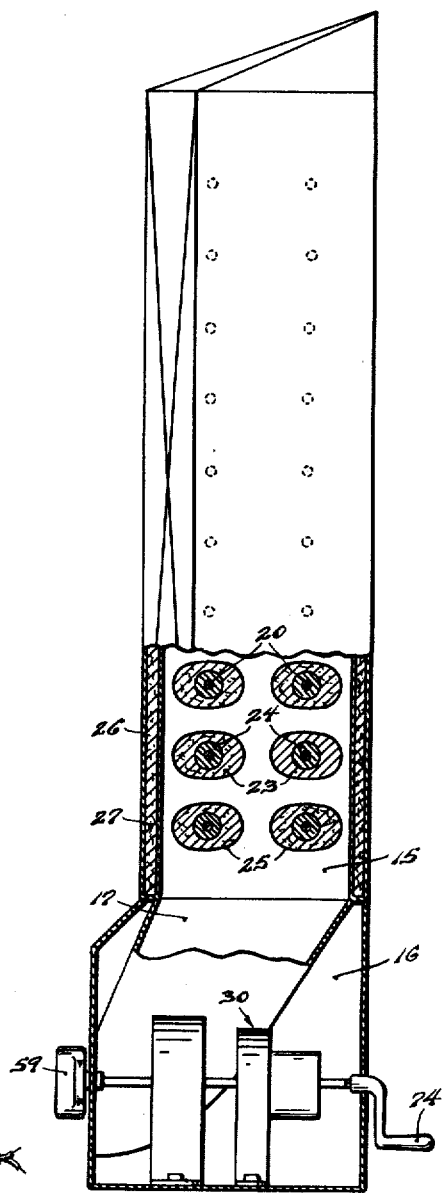
Figure 8:
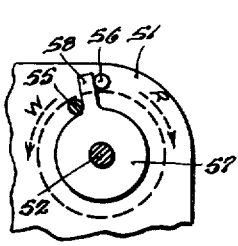
Figure 9:
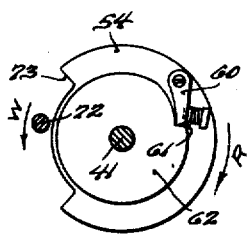
Figure 10:
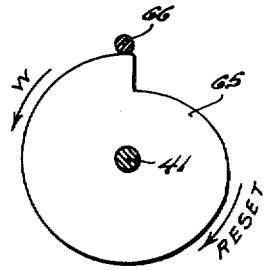
Figure 11:
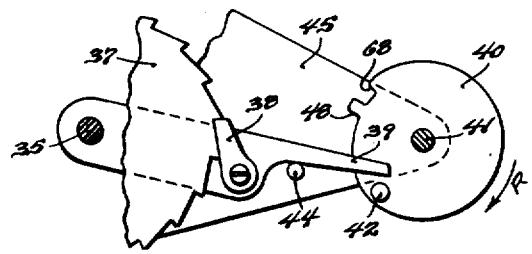
Figure 12:
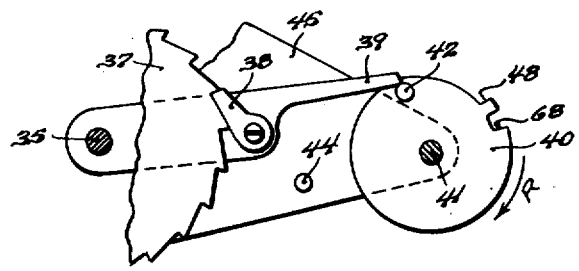

Figs. 8, 9, and 10 are detail transverse vertical sections taken on the respective section lines 8—8, 9—9, and 10—10 of Fig. 6; and Figs. 11 and 12 are detail views similar in part to the showing of Fig. 7 to represent, with Fig. 7, the positions of the switch-controlling pawl in operating the switch through a wiener-vending operation, or cycle of the machine.

Reference being had to the drawings, the machine is formed with a cabinet which desirably is divided into two chambers 15 and 16, the lower chamber 16 operating as a housing for control mechanism and the upper chamber 15 serving as a compartment for the reception of a plurality of wiener sandwiches. In the illustrated showing, we have designed said compartment with a 20-unit capacity, the sandwiches being supported horizontally between the opposite side walls of the compartment in two vertically extending rows, the lowermost sandwich in each row being broiled and released, successively, into a chute 17 which leads to a delivery pocket 18. Operating through the control mechanism referred to in effecting the broiling and release of the sandwiches, said side walls of the sandwich compartment are provided with horizontal solenoids 19 located in the plane of the respective sandwiches, the armatures for said solenoids comprising pins 20 pointed to penetrate the opposite ends of the wieners and formed at the outer ends with flanged heads 21 adapted to engage shoulder surfaces of a plate member 22 of the compartment side walls for limiting the extent of movement of the pins inwardly. Said pins, in broiling the wieners, operate as the positive and negative poles of a normally incomplete electric circuit, the release of a sandwich following the broiling of the same being afforded by an energizing of the related solenoids to withdraw the pins from the wiener.

We produce the sandwiches, particularly referring to Figs. 4 and 5, by removing from a bun such as 23 of the normal character used for this character of food product, a center portion of approximately the dimensions of the wiener, coating the wall of the opening with a suitable quantity of mustard, inserting the wiener 24, and subsequently sealing the sandwich in a wrapper 25 of Cellophane or an equivalent material, the armature pins penetrating the opposite ends of the Cellophane to extend into the wiener. No particular novelty resides in the method of inducing a flow of current through a wiener to broil the same, the current flowing by reason of the moisture content of the wiener. It is pointed out, however, that the broiling in the present instance is performed in a relatively sealed container to the end that the bun absorbs a material quantity of the juice of the wiener previously lost during cooking. To facilitate the filling of the sandwich compartment, the same is open at the front and rear, a closure therefor comprising a shell 26 formed with a non-conductive lining 27 for resisting the transmission of heat, said shell being normally locked against withdrawal and adapted for the reception of a refrigerating agent such as compressed carbon dioxide in the dome portion of the same.

More especially as respects the control mechanism for said machine, we provide, in the lower chamber 16, a switch box 30 in which is supported a stationary annular disk 31 formed about its inner periphery with a plurality of spaced contact points 32. As indicated in Fig. 3, said points are arranged in series of three, the first point in each series of three contacts being dead with the succeeding two points operating through the medium of a switch 33 carried on a rotor 34 to complete a circuit, successively, through a pair of armature pins and, following a time interval, through the solenoids related thereto. The shaft 35 for said rotor carries a ratchet wheel 37, a pawl 38 being supported by a lever 39 to engage the teeth of said ratchet for operating the same. The lever, fulcrumed about the shaft 35, extends in laterally spaced relation to and beyond the peripheral limits of a disk 40 to obtain reciprocatory movement of the lever responsive to the engagement of a pin 42 extending laterally from and revoluble with the disk, said pin operating to elevate the lever through substantially 90° of disk movement in opposition to a spring 43 tending to influence the lever toward a stop pin 44 supported in a frame extension 45. As will be hereinafter more particularly described in connection with the operation of the machine, the elevation of the lever commencing from a point as indicated in Fig. 7, the same is subsequently released as the pin 42 clears the lever tip, the spring returning the lever to the position indicated in Fig. 11 where the pin re-engages the same in its elevational movement, the total lever movement approximating an arc defining the space between two successive ratchet teeth with the ratchet movement in turn operating the switch through a single series of three contact points on the disk 31. A pawl 46 bearing against the rim surface of the disk 40 is arranged to engage a shoulder 48 of the disk following completion of the disk's rotary travel to prevent counterrotation of the same.

We illustrate, as a source of power for driving the disk 40, a clock-work mechanism providing a conventional spiral spring. Said spring, housed in a casing 51, operates a shaft 52 which extends in driving relation into the center bore of a member 50 formed with flange ends 53, 54. In transmitting spring-influenced rotary movement from the shaft 52 to the shaft 41, a pawl 60 is supported in the face of the flange 54 to engage a surface notch 61 of a wheel 62 carried on the shaft 41. For winding purposes, an exposed handle 59 is supported on the spring shaft exteriorly of the front wall of the cabinet and to accommodate winding in excess of one revolution, the object being to prevent back-lash in the spring mechanism, we provide an idler disk 57 loosely mounted over the shaft 52 between the flange face 53 and the spring casing 51, said disk providing an arm extension 58 which lies between a stationary pin 56 carried by the spring casing and a pin 55 carried by the flange face 53, the pin 55 being spaced radially inwardly as respects the pin 56 to pass the same in the revoluble movement of the member 52.

Also provided, its object being to facilitate the setting of the machine following filling operations whereby the number 1 sandwich is initially vended, we form the disk 40 with a notch 68 adapted to register in the starting position of the disk with the depending toe of a lever 67. Said lever, which normally is held in an elevated position above the notch by means of a trigger 69, is released to engage the notch following the engagement with said trigger of a pin 70 set into the ratchet wheel in a disposition related to the number 1 electric circuit of the machine. To release the disk from its locked position, the lever 67 is elevated as the spring mechanism is wound preparatory to vending the first sandwich, a cam 65 operating to elevate a pin 66 carried by the lever whereat the trigger, spring-influenced, lodges under the lever. Connecting the cam, which is loosely mounted over the shaft 41, with the spring shaft 52, a pin 72 is provided to extend into a peripheral slot 73 cut into the perimeter of the flange face 54. Said slot arrangement of the flange face 54 serves to prevent the cam being turned in excess of one revolution as the spring is wound. 74 indicates a crank adapted to be inserted by the operator through the rear wall of the cabinet to engage the shaft 41 in resetting the machine following a filling operation.

In the several views, the arrows W and R represent the direction of rotation of the parts during winding and running periods, the running direction being clockwise as respects the direction of view in which the several Figures 7 through 12 are taken.

The machine, as the same is now produced, operates with a coin control for releasing the winding handle 59. We have not represented this structure by reason of the same being conventional. In operation, a coin is inserted and the winding handle 59 turned in a clockwise direction. Pin 55, in an obvious manner, traverses a complete circle and, following winding, the flange face 54 drives through the pawl 60 to rotate the wheel 62 and disk 40. Pin 42 elevates the lever 39 from its normal starting position as indicated in Fig. 7 to operate the pawl 38 in moving the ratchet wheel approximately one-sixtieth of a turn, withdrawing the brush switch 33 from the dead point and contacting the same with the initial live point to complete a circuit through one pair of aligned armature pins 20 to induce a flow of current through the wiener in which the points of the pins are engaged. The lever 39 following contact of the switch with the initial live point is released by the pin 42 to engage the stop pin 44 under the influence of the spring 43 to retract the pawl 38 and engage the same against the following ratchet tooth. The pin 42 subsequently re-engages the lever 39 to elevate the same in moving the ratchet wheel under the influence of the pawl 38 approximately one-thirtieth of a turn, the switch 33 brushing over the second live contact point of the switch series to energize the solenoids related to the armature pins of the previously energized circuit in withdrawing the pins from the broiled wiener, the switch stopping on a following dead point of the succeeding series. Each wiener, as a coin is inserted in the machine and the spring wound, is broiled and the sandwich vended to the customer through the delivery chute 17 and the pocket 18. Where it is desired to refill the machine prior to the depletion of the previous filling, the wiener sandwiches are inserted in the empty units with the armature pins in each instance being replaced by clean pins. A suitable acid bath is used in cleaning the used pins to free the same of carbon and meat deposit.

The invention is believed clear from the foregoing. It is our intention, however, to limit the same only within the scope of the hereto annexed claims, it being understood that the term "wiener" embraces any and all applicable products containing moisture or the like as a conductive medium and otherwise constituted such that the flow of current is afforded sufficient resistance to afford dispersion of heat.

What we claim, is:—

1. In a machine for broiling and vending wiener sandwiches, the combination with a cabinet providing a compartment for supporting a plurality of wiener sandwiches, means operating in each cycle of operation of the machine for broiling the wiener of one of said sandwiches and releasing the broiled-wiener sandwich, successively, said means comprising a plurality of normally incomplete electric circuits arranged in pairs, one circuit in each pair operating to broil the wiener of one of said sandwiches and the other circuit in a pair operating to release the sandwich, a rotary member providing a brush switch having electric connection with each of said circuits to operate as one circuit-closing terminal of the same, an annular member providing circumferentially spaced pairs of successive contact points located in the path of travel of the brush switch and operating as the other circuit-closing terminals of the respective pairs of circuits, a ratchet wheel connected with the rotor for said switch having its respective teeth defining an arc within the traversed angle of which a respective pair of said contact points are embraced, a lever journaled for reciprocatory movement about the axis of rotation of the ratchet wheel, a pawl on said lever arranged to engage the successive ratchet teeth, and means engaging said lever in each cycle of operation of the machine for operating said pawl through an arc defining the limits of one of said teeth of the ratchet wheel.

2. In a machine for broiling and vending wiener sandwiches, a cabinet providing a compartment for the reception of a plurality of the sandwiches, means including a plurality of normally incomplete electric circuits for broiling and vending one of said sandwiches in each cycle of operation of the machine, and means for controlling the energizing of said circuits, said control means comprising a rotary switch providing a plurality of circuti-closing terminals, one for each of the respective circuits, a ratchet wheel connected with the switch for operating the same, and means for operating the ratchet wheel, said operating means comprising a pawl, a rotary disk having operative connection with the pawl, a spiral spring operating as a source of power, a drive shaft from said spring, means normally operating to couple said drive shaft with the rotary disk for transmitting rotation from the spring to the disk, and manually operated means for imparting tension to the spring.

3. The structure as defined in claim 2, and means for uncoupling the drive shaft from the disk to accommodate movement of the disk independently of the spring for setting the switch in position to vend the initial wiener from the machine following a filling operation.

4. In a machine for vending wiener sandwiches, a compartment for the sandwiches providing plural pairs of horizontally aligned electrically energized solenoids and armatures for the solenoids, said armatures comprising electrode pins adapted to penetrate the ends of the wieners for supporting the wieners between respective aligned pairs of solenoids, a rotary switch for energizing a predetermined pair of said pins and the solenoids related thereto, successively, to cause a flow of current through the wiener and, following a time interval, retract the pins from the same, respectively, in each cycle of operation of the machine, a source of rotary power, means for transmitting said power to the rotary switch, and manually operated means for controlling said power transmission.

5. In a machine for vending wiener sandwiches, a compartment for the sandwiches providing plural pairs of horizontally aligned electrically energized solenoids and armatures for the solenoids, said armatures comprising electrode pins adapted to penetrate the ends of the wieners for supporting the sandwiches between respective aligned pairs of solenoids, a switch for energizing a predetermined pair of said pin elements and the solenoids related thereto, successively, to cause a flow of current through the wiener and, following a time interval, retract the pins from the wiener, respectively, in each cycle of operation of the machine, a source of power for operating said switch, and means for regulating the transmission of power from the source to said switch.

6. In a machine for vending wiener sandwiches, companion horizontally aligned solenoids and armatures for said solenoids, said armatures providing electrode terminals normally projecting inwardly from the solenoids to penetrate the opposite ends of a wiener introduced between the solenoids, a normally incomplete electric circuit common to both of said armature electrodes, a normally incomplete electric circuit common to the solenoids, and means for successively energizing said circuits to cause a flow of current through the armature electrodes and through the solenoids for broiling the wiener and retracting the electrodes to release the wiener, respectively.

7. In combination, a plurality of normally incomplete electric circuits, circuit-closing means therefor comprising a rotor, a brush switch carried by the rotor, annular means providing a plurality of circumferentially spaced contact points co-active with the switch for closing said circuits successively, and means operative to drive said rotor for regulating the time interval of operation of the successive circuits, said rotor-driving means comprising a ratchet wheel having drive relationship with the rotor, a lever journaled for reciprocatory movement about the axis of rotation of the ratchet wheel, a pawl on said lever operative to engage successive teeth of said ratchet wheel responsive to the reciprocatory movement of the lever, a spring engaging said lever, and means co-active with said spring for controlling the time interval between successive tooth-influencing movements of the lever.

8. The structure as defined in claim 7, said last-named means comprising a rotary disk, and a laterally-extending pin thereon carried in an eccentric disposition as respects the axis of rotation of the disk to traverse the path of reciprocatory travel of the lever.

9. Means including an electrode for obtaining a flow of current through a conductive medium and, following a time interval, withdrawing the electrode from the medium which comprises, in combination with the electrode, an armature supporting the electrode, a solenoid for the armature, a normally incomplete electric circuit including the electrode, a normally incomplete electric circuit including the solenoid, a switch for closing the electrode circuit to traverse the medium with electric current, a switch for closing the solenoid circuit for traversing the solenoid with electric current in magnetically attracting the armature to withdraw the electrode from the medium, and mechanism for operating said switches successively.

10. Means including an electrode for obtaining a flow of current through a conductive medium and withdrawing the electrode from the medium, successively, which comprises, in combination with the electrode, a solenoid, an armature for the solenoid operative to withdraw the electrode from the medium in response to the influence of magnetic attraction on the armature, a normally incomplete electric circuit including the electrode, a normally incomplete electric circuit including the solenoid, a switch for closing the electrode circuit to traverse the medium with electric current, a switch for closing the solenoid circuit to traverse the solenoid with electric current in magnetically attracting the armature, and means for operating said switches successively.

11. The method of broiling and vending a wiener sandwich wherein the moisture in the wiener is utilized as a conductive medium in traversing the wiener with electric current to broil the same, said method constituting in the successive steps of inserting armature-carrying electrodes into opposite ends of the sandwich to penetrate the wiener, closing an electric circuit through the electrode and the wiener, and, following a predetermined time interval, producing a magnetic field about the exposed ends of the electrodes to withdraw the electrodes from the wiener to release the latter.

12. The method of broiling wieners wherein the moisture in the wiener is utilized as a conductive medium to accommodate the flow of electricity through the wiener in broiling the same, said method consisting in inserting electrodes into opposite ends of the wiener to penetrate the same, closing an electric circuit including the electrodes, and, following a time interval, producing a magnetic field about the exposed ends of the electrode to withdraw the electrodes from the wiener through magnetic attraction.

13. The method of preparing a wiener sandwich whereby to seal the broiling-influenced juices of the wiener within the sandwich, consisting in inserting a wiener in a bun, wrapping the sandwich in Cellophane or other like or similar material, inserting electrodes through opposite ends of the wrapping to penetrate opposite ends of the wiener, and closing an electric circuit including the electrodes to traverse the moisture of the wiener with electric current.

14. In a machine for vending wiener sandwiches, a cabinet providing a compartment for the reception of a plurality of the sandwiches, a plurality of independent normally incomplete electric circuits operating to broil the wieners of the respective sandwiches, a plurality of independent normally incomplete electric circuits operating to release the respective sandwiches for delivering the same following the broiling of the wieners, and means for controlling said machine to close a pair of said circuits related to one of the sandwiches in each cycle of operation of the machine.

15. In a machine for vending wiener sandwiches, a cabinet providing a compartment for the reception of a plurality of the sandwiches, a plurality of independent normally incomplete electric circuits, one for each of the sandwiches, operating to broil the wieners of the respective sandwiches, means operating to close said circuits successively and open the same following a predetermined time interval in the successive cycles of operation of the machine, and means for releasing the sandwiches from the machine following the broiling of the respective sandwiches.

16. A machine for vending wieners or other like or similar product containing an electrically-conductive body comprised of the combination of means acting to support the wiener, a normally incomplete electric circuit including the supported wiener operating in response to circuit closure to traverse the wiener with electric current for broiling the same, a normally incomplete electric circuit operative to said supporting means for actuating the same following a broiling operation to release the wiener, and independent switches for closing said circuits successively.

17. A machine for vending a cookable commodity comprising the combination of a cabinet, means for supporting a plurality of the products to be cooked within said cabinet, a plurality of normally incomplete electric circuits, one for each of the supported products, operating to cook the products in response to circuit closure, and circuit-closing means for said electric circuits comprising a driven rotary member acting, in response to the rotary movement thereof, to close the respective circuits successively.

18. A machine for vending a cookable commodity comprising, in combination with a cooking compartment adapted to receive a plurality of the products to be cooked, independent normally incomplete electric circuits for each of said products operating to cook the products, circuit-closing means therefor, mechanism operatively associated with said circuit-closing means acting to automatically govern the same to close one only of said circuits and thereby cook a single product in each cycle of operation of the machine, and means for releasing the products from the compartment following the operation of cooking the same.

19. A machine for cooking a wiener or other like or similar product capable of being traversed by electric current comprising, in combination with a normally incomplete electric circuit including electrodes adapted to penetrate the opposite ends of the product, means for closing said circuit to cause an electric current to flow from one to the other electrode through the wiener, and mechanism operating automatically, following a cooking of the product by the act of passing current through the same, for withdrawing the electrodes from the product.

20. In a machine for broiling wieners or other like or similar product capable of being traversed by electric current whereby to cook the product, means including electrodes adapted to penetrate the product for closing a normally open electric circuit to cause the current to traverse the product, time-controlled mechanism, and means operated by said time-controlled mechanism for withdrawing the electrodes from the product automatically following a cooking operation of predetermined duration.

21. In a machine for cooking a wiener or other product capable of being traversed by electric current, a normally incomplete electric circuit including conductors adapted to be contactually associated with the product for cooking the product by the act of passing an electric current through the same, and electrically-operated means associated with said conductors for breaking contact as between the same and the product following the operation of cooking the product.

SAMUEL VERNER McCONNELL.
ROBERT P. OLSSON.

CERTIFICATE OF CORRECTION.

Patent No. 2,139,690. December 13, 1938.

SAMUEL VERNER McCONNELL, ET AL.

It is hereby certified that error appears in the printed specification of the above numbered patent requiring correction as follows: Page 4, first column, line 15, claim 11, for the word "constituting" read consisting; and that the said Letters Patent should be read with this correction therein that the same may conform to the record of the case in the Patent Office.

Signed and sealed this 14th day of February, A.D. 1939.

Henry Van Arsdale.

(Seal)

Acting Commissioner of Patents.